US012801196B2

(12) United States Patent
Lim

(10) Patent No.: US 12,801,196 B2
(45) Date of Patent: Nov. 17, 2026

(54) BUS POWERED DEVICE

(71) Applicant: Razer (ASIA-PACIFIC) PTE LTD., Singapore (SG)

(72) Inventor: Hong Chiang Lim, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 93 days.

(21) Appl. No.: 18/864,571

(22) PCT Filed: Jul. 8, 2022

(86) PCT No.: PCT/SG2022/050477
§ 371 (c)(1),
(2) Date: Nov. 11, 2024

(87) PCT Pub. No.: WO2024/010519
PCT Pub. Date: Jan. 11, 2024

(65) Prior Publication Data
US 2025/0335013 A1 Oct. 30, 2025

(51) Int. Cl.
*G06F 1/26* (2006.01)
*G06F 13/40* (2006.01)

(52) U.S. Cl.
CPC ............ *G06F 1/26* (2013.01); *G06F 13/4004* (2013.01); *G06F 2213/40* (2013.01)

(58) Field of Classification Search
None
See application file for complete search history.

(56) References Cited

U.S. PATENT DOCUMENTS

| | | | |
|---|---|---|---|
| 9,203,254 B2 | 12/2015 | Milazzo et al. | |
| 9,914,548 B1 | 3/2018 | Vadillo | |
| 10,116,157 B2 | 10/2018 | Wang et al. | |
| 2004/0258257 A1* | 12/2004 | Hupp | G06F 3/162 381/104 |
| 2011/0107124 A1 | 5/2011 | Twycross et al. | |

(Continued)

FOREIGN PATENT DOCUMENTS

| | | |
|---|---|---|
| KR | 10-2015-0096901 A | 8/2014 |
| TW | I498717 B | 9/2015 |

OTHER PUBLICATIONS

USB PD Power Negotiation (Year: 2016).*
(Continued)

*Primary Examiner* — Kim Huynh
(74) *Attorney, Agent, or Firm* — Polsinelli PC

(57) ABSTRACT

In some aspects, a bus powered sound system include an amplifier, a bus connector, an acquisition module, a determination module and a controller module. The bus connector is configured for connecting to an interface of a host system to provide power to the amplifier. The acquisition module is configured to acquire a type of the interface of the host system and an available power of the host system. The determination module is configured to communicate with the acquisition module and determine a power level to be distributed from the host system to the amplifier based on the type of the interface and the available power of the host system. The controller module is configured to communicate with the determination module and distribute the determined power level to one or more channels of the sound system.

20 Claims, 7 Drawing Sheets

(56) References Cited

U.S. PATENT DOCUMENTS

| | | | | |
|---|---|---|---|---|
| 2013/0073758 | A1 | 3/2013 | Chang et al. | |
| 2013/0238920 | A1 | 9/2013 | Harris | |
| 2015/0323979 | A1 | 11/2015 | Kaestner | |
| 2016/0190794 | A1 | 6/2016 | Forghani-Zadeh et al. | |
| 2016/0216757 | A1 | 7/2016 | Kim et al. | |
| 2016/0315490 | A1 | 10/2016 | Xu et al. | |
| 2017/0023993 | A1 | 1/2017 | Sultenfuss et al. | |
| 2017/0085084 | A1 | 3/2017 | Daly | |
| 2017/0222450 | A1 | 8/2017 | Lee | |
| 2017/0293335 | A1* | 10/2017 | Dunstan | G06F 1/266 |
| 2018/0120910 | A1 | 5/2018 | Farkas et al. | |
| 2018/0136705 | A1 | 5/2018 | Obie et al. | |
| 2020/0343726 | A1 | 10/2020 | Nakamura | |
| 2021/0120639 | A1 | 4/2021 | Guatta et al. | |
| 2021/0123985 | A1 | 4/2021 | Suzuki | |
| 2021/0218282 | A1 | 7/2021 | Ettes et al. | |
| 2022/0078548 | A1 | 3/2022 | Dang et al. | |
| 2022/0229457 | A1* | 7/2022 | Palit | G05F 1/625 |

OTHER PUBLICATIONS

Understanding Distributed Speaker System (Year: 2018).*

How Multiple Speakers share power (Year: 2019).*

European Search Report; dated Jul. 10, 2025; Application # 22950394.1.

International Search Report; dated Mar. 30, 2023; application # PCT/SG2022/050477.

* cited by examiner

BUS POWERED DEVICE

TECHNICAL FIELD

The present disclosure generally relates to a bus powered device, in particular, a USB powered sound system.

BACKGROUND

It is widely used that computer peripheral devices are powered by a bus connection cable. For example, Universal Serial Bus (USB) is one of standards for connecting a peripheral device to a host system such as a computer, and power can be supplied at the same time as communication between the peripheral device and the host system.

Therefore, there exists a need for devices powered by a bus connection that have improved power controls.

SUMMARY

According to a first aspect of the present disclosure, a bus powered device is provided. The bus powered device may include an amplifier; a bus connector for connecting to an interface of a host system to provide power to the amplifier; an acquisition module configured to acquire a type of the interface of the host system and an available power of the host system; a determination module configured to communicate with the acquisition module and determine a power level to be distributed from the host system to the amplifier based on the type of the interface and the available power of the host system; and a controller module configured to communicate with the determination module and distribute the determined power level to one or more channels of the sound system.

According to a second aspect of the present disclosure, a bus powered device is provided. The bus powered device may include a bus connector for connecting to an interface of a host system to provide power to the device; an acquisition module configured to acquire a type of the interface of the host system and a power of the host system available for use by the device; a determination module configured to determine a power level to be distributed from the host system to the device based on the type of the interface and the power of the host system available for use by the device; and a controller module configured to communicate with the determination module and distribute the determined power level to the device.

According to a fourth aspect of the present disclosure, a universal serial bus (USB) powered device is provided. The USB powered device may include: a USB power delivery (PD) integrated circuit (IC) interface for connecting to an interface of a host system to provide power to the device, the USB PD IC interface comprising: configuration channel (CC) pins configured to acquire a type of the interface of the host system and a power of the host system available for use by the device; and a determination module configured to determine a power level to be distributed from the host system to the device based on the type of the interface and the power of the host system available for use by the device; and a controller module configured to communicate with the USB PD IC interface and distribute the determined power level to the device.

According to a fourth aspect of the present disclosure, a method implemented by a bus powered sound system is provided. The method may include: connecting a bus connector of the sound system to an interface of a host system; obtaining information indicative of a type of the interface of the host system and information indicative of an available power of the host system; determining a power level to be distributed from the host system to the sound system based on the information indicative of the type of the interface of the host system and the information indicative of the available power of the host system; and distributing the determined power level to one or more channels of the sound system.

DETAILED DESCRIPTION

Figure 1:
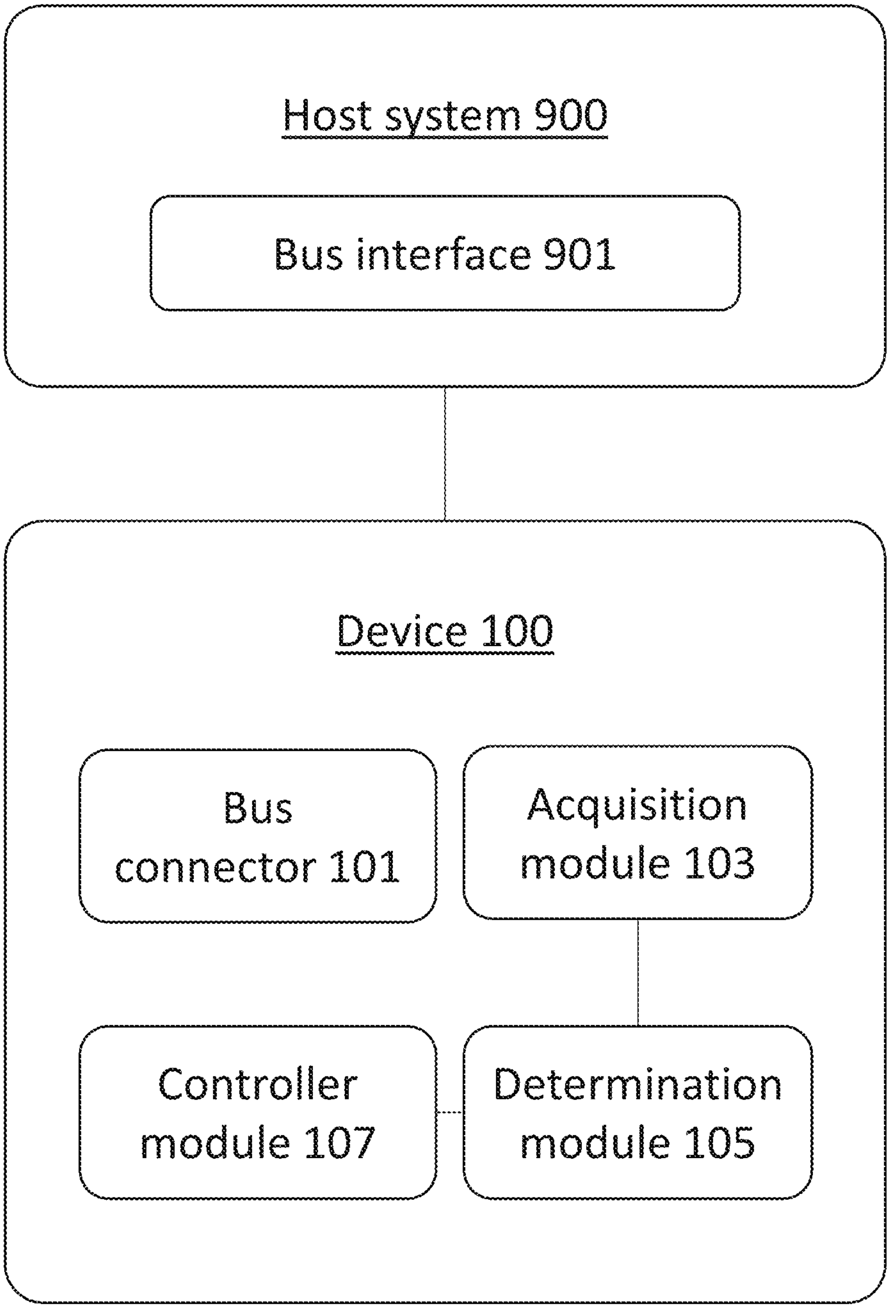
FIG. 1 is a block diagram depicting an example configuration of a bus powered device in connection to a host system according to an embodiment of the present disclosure.

Embodiments described below in the context of a device, apparatus, or system are analogously valid for the respective methods, and vice versa. Furthermore, it will be understood that the embodiments described below may be combined, for example, a part of one embodiment may be combined with a part of another embodiment, and a part of one implementation may be combined with a part of another implementation.

It should be understood that the singular terms "a", "an", and "the" include plural references unless context clearly indicates otherwise. Similarly, the word "or" is intended to include "and" unless the context clearly indicates otherwise.

It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more steps or elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Approximating language, as used herein throughout the specification and claims, may be applied to modify any quantitative representation that could permissibly vary without resulting in a change in the basic function to which it is related. Accordingly, a value modified by a term or terms, such as "about," "substantially", is not limited to the precise value specified but within tolerances that are acceptable for operation of the embodiment for an application for which it is intended. In some instances, the approximating language may correspond to the precision of an instrument for measuring the value.

Various techniques may be described herein in the general context of software, hardware elements, or program modules. Generally, such modules include routines, programs, objects, elements, components, data structures, and so forth that perform particular tasks or implement particular abstract data types. The terms "module," "functionality." and "component as used herein generally represent software, firmware, hardware, or a combination thereof. The features of the techniques described herein are platform independent, meaning that the techniques may be implemented on a variety of commercial computing platforms having a variety of processors.

Various aspects of what is described here seek to provide a device that may be powered via a bus connection. The proposed device may include a bus connector for connecting to an interface (e. g. a port, a connector, etc.) of a host system to provide power to the device. The host system may include a personal computer, a laptop, a USB power delivery (PD) power adaptor, a USB PD battery power bank, or any suitable system that can provide power transfer (e. g. a power unit) and data communication (e. g. a processing unit). The proposed device may include an acquisition module configured to acquire a type of the interface (e. g. the port, the connector, etc.) of the host system and a power of the host system available for use by the device. The proposed device may be powered by a USB connection and the configuration channel (CC) pins of the USB PD may act as the acquisition module. The proposed device may also include a determination module configured to determine a power level to be distributed (e. g. transferred) from the host system to the device based on the type of the interface (e. g. the port, the connector) and the power of the host system available for use by the device. The proposed device may be powered by a USB connection and the determination module may be included in the USB PD. The proposed device may further include a controller module configured to communicate with the determination module and distribute (e. g. assign) the determined power level to the device. The proposed device may be powered by a USB connection and accordingly, the USB PD IC may act as a front end interface of the device and negotiate (e. g. communicate) with the host system on the available power. By negotiating, it is intended to mean acquiring information indicative of a type of the interface (e. g. the port, the connector, etc.) of the host system and information indicative of a power of the host system available for use by the device and determining a power level to be distributed (e. g. transferred) from the host system to the device based on both information.

According to various aspects, the proposed device may include a switch. The switch may be configured to be turned on after the power level to be distributed from the host system to the amplifier is determined. By "after", it is intended to also include that the switch may be turned on simultaneously when the power level to be distributed from the host system to the amplifier is determined. Hence, power may not be transferred from the host system to the device if the switch is not turned on. The switch may include a metal-oxide-semiconductor field-effect transistor (MOSFET). The proposed device may be powered by a USB connection and accordingly, the USB PD IC may apply a voltage on the MOSFET switch to turn it on by allowing the current to flow and apply no voltage on the MOSFET switch to turn it off. Further, dependent on the conductivity type of the MOSFET (e.g. p-type or n-type), the voltage may be negative or positive to turn the switch on. Moreover, the MOSFET switch may have a suitable on resistance as so to allow a current of desirable range to flow under the voltage applied by the USB PD IC.

In some aspects of what is described here, the available power of host system may not be equal to the determined power level to be distributed (transferred or assigned) to the device. The determined power level may be set as less than half of the available power of the host system to avoid saturation or power trip when the device is in high demand, for example, an audio play of a sound system is at maximum volume. The available power of the host system may be the maximum power that the host system is able to distribute (transfer or assign) to the device coupled to. Accordingly, the determined power level may be considered as a maximum amount of power that the device is able to obtain from the host system. Hence, the proposed device may be provided with the maximum power after negotiating (e.g. communicating) with the host system. The determined power level may increase as a maximum current of the interface (e.g. port, connector) of the host system dependent on the type thereof increases. The determined power level may increase according to a stepped profile.

In some aspects of what is described here, the proposed device may include a sound system having an amplifier and one or more speaker channels. The sound system may include a power management system. The control module may distribute the determined power level to the one or more channels of the sound system through the power management system. The power management system may be configured to adjust an amplification of the amplifier according to the determined power level. The determined power level may be equally distributed to each of the one or more channels of the sound system. The determination module may be further configured to determine the power level to be distributed from the host system to the amplifier based on a demand of the amplifier.

In some instances, aspects of the systems and techniques described here provide technical improvements and advantages over existing approaches. In an example, the USB PD IC may automatically negotiate (e.g. communicate) with the host system to deliver maximum power to the device in light of the type of the interface of the host system, thereby less USB power compatibility issues. For example, the proposed bus powered sound system may provide automatic adjustment of power amplification in accordance with the maximum available power to be distributed (e.g. transferred) from the host system to the sound system. The power amplification may be automatically adjusted dependent on the maximum available power. This may prevent over amplification (over drain of power) in situation where the host system cannot supply sufficient power for the preset (prefix) amplification, thereby causing the host system to shut down or high distortion audio playback or even worst condition of damaging the lightly protected USB port of the host system. This may also prevent situations where constant power-trip due to host power delivery protection scheme kick-in to prevent external device from damaging the connected USB port, when the audio volume is set to high, and accordingly users may not be allowed to play their preferred loudness (SPL-sound pressure level) from the speaker.

Consequently, the available power of the host system may be used more efficiently and the power level to be distributed (e.g. transferred) may be dynamically tailored to different devices coupled to the host system. The performance of the devices coupled to the host system may be increased by intelligently negotiating (e.g. communicating) with the host system and consequently distributing (e.g. transferring or supplying) maximum power to the devices. One reason for implementation of the techniques described herein is to enable the devices coupled to the host system to have better control over power distribution and prevent causing damage or distortion due to mismatch.

The following examples pertain to various aspects of the present disclosure.

Example 1 is a bus powered sound system including: an amplifier; a bus connector for connecting to an interface of a host system to provide power to the amplifier; an acquisition module configured to acquire a type of the interface of the host system and an available power of the host system; a determination module configured to communicate with the acquisition module and determine a power level to be distributed from the host system to the amplifier based on the type of the interface and the available power of the host system; and a controller module configured to communicate with the determination module and distribute the determined power level to one or more channels of the sound system.

In Example 2, the subject matter of Example 1 may optionally include that the determined power level increases as a maximum current of the interface of the host system dependent on the type thereof increases.

In Example 3, the subject matter of any one of Examples 1 to 2 may optionally include the determination module is further configured to determine the power level to be distributed from the host system to the amplifier based on a demand of the amplifier.

In Example 4, the subject matter of any one of Examples 1 to 3 may optionally include a switch in serial connection with the amplifier, wherein the switch is configured to be turned on after the power level to be distributed from the host system to the amplifier is determined.

In Example 5, the subject matter of Example 4 may optionally include that the switch comprises a metal-oxide-semiconductor field-effect transistor (MOSFET).

In Example 6, the subject matter of any one of Examples 1 to 5 may optionally include that the determined power level is less than half of the available power of the host system.

In Example 7, the subject matter of any one of Examples 1 to 6 may optionally include that the determined power level is equally distributed to each of the one or more channels of the sound system.

In Example 8, the subject matter of any one of Examples 1 to 7 may optionally include that the USB connector comprises configuration channel (CC) pins configured to acquire the type of the interface of the host system and the available power of the host system, whereby the CC pins act as the acquisition module.

In Example 9, the subject matter of any one of Examples 1 to 8 may optionally include a power management system, wherein the controller module is configured to distribute the determined power level to the one or more channels of the sound system through the power management system, wherein the power management system is configured to adjust an amplification of the amplifier according to the determined power level.

In Example 10, the subject matter of any one of Examples 1 to 9 may optionally include that the bus connector comprise a universal serial bus (USB) connector.

In Example 11, the subject matter of any one of Examples 1 to 10 may optionally include that the host system comprises at least one of a personal computer, a laptop, a USB power delivery (PD) power adaptor or a USB PD battery power bank.

In Example 12, the subject matter of any one of Examples 1 to 11 may optionally include that the controller module comprises a microcontroller or a Bluetooth system on a chip (SoC).

Example 13 is a bus powered device comprising: a bus connector for connecting to an interface of a host system to provide power to the device; an acquisition module configured to acquire a type of the interface of the host system and a power of the host system available for use by the device; a determination module configured to determine a power level to be distributed from the host system to the device based on the type of the interface and the power of the host system available for use by the device; and a controller module configured to communicate with the determination module and distribute the determined power level to the device.

In Example 14, the subject matter of Example 13 may optionally include that he bus connector comprises a universal serial bus (USB) connector.

Example 15 is a universal serial bus (USB) powered device comprising: a USB power delivery (PD) integrated circuit (IC) interface for connecting to an interface of a host system to provide power to the device, the USB PD IC interface comprising: configuration channel (CC) pins configured to acquire a type of the interface of the host system and a power of the host system available for use by the device; and a determination module configured to determine a power level to be distributed from the host system to the device based on the type of the interface and the power of the host system available for use by the device; and a controller module configured to communicate with the USB PD IC interface and distribute the determined power level to the device.

Example 16 is a method implemented by a bus powered sound system comprising: connecting a bus connector of the sound system to an interface of a host system; obtaining information indicative of a type of the interface of the host system and information indicative of an available power of the host system; determining a power level to be distributed from the host system to the sound system based on the information indicative of the type of the interface of the host system and the information indicative of the available power of the host system; and distributing the determined power level to one or more channels of the sound system.

In Example 17, the subject matter of Example 16 may optionally include that the determined power level increases as a maximum current of the interface of the host system dependent on the type thereof increases.

In Example 18, the subject matter of any one of Examples 16 to 17 may optionally include that the determined power level increases according to a stepped profile.

In Example 19, the subject matter of any one of Examples 16 to 18 may optionally include that the step of determining the power level to be distributed from the host system to the sound system comprises determining the power level based on a demand of the sound system.

In Example 20, the subject matter of any one of Examples 16 to 19 may optionally include turning on a switch so as to close a voltage bus circuit to distribute the determined power level to the sound system after the power level to be distributed from the host system to the sound system is determined.

In Example 21, the subject matter of Example 20 may optionally include that the switch comprises a metal-oxide-semiconductor field-effect transistor (MOSFET).

In Example 22, the subject matter of any one of Examples 16 to 21 may optionally include that the determined power level is less than half of the available power of the host system.

In Example 23, the subject matter of any one of Examples 16 to 22 may optionally include that the determined power level is equally distributed to each of the one or more channels of the sound system.

In Example 24, the subject matter of Example 23 may optionally include that the equally distributed power level comprises an integer number or an integer number plus a half of an integer number.

In Example 25, the subject matter of Example 18 may optionally include that the step of determining the power level to be distributed from the host system to the sound system comprises determining the power level as a predetermined power level when the step of obtaining the information indicative of the type of the interface of the host system and the information indicative of the available power of the host system fails to obtain either of the information.

In Example 26, the subject matter of Example 25 may optionally include that the predetermined power level is equal to a lowest power level according to the stepped profile of the determined power level.

In Example 27, the subject matter of any one of Examples 16 to 26 may optionally include that the bus connector comprises a universal serial bus (USB) connector.

In the following description, an example configuration and system/devices are first described that may employ the techniques described herein. Example details and methods are then described which may be performed in the example configuration and by the system/devices as well as in other configurations and by other system/devices. Consequently, implementation of the example details and methods is not limited to the example configuration and system/devices, and the example configuration and system/devices are not limited to the example details and methods.

FIG. 1 is a block diagram depicting an example configuration of a device 100 in connection to a host system 900 according to an embodiment of the present disclosure. According to various non-limiting embodiments, the device 100 may be powered by a bus connection, that is, obtain power from a system/device coupled with a bus connection. The bus connection may transfer data and energy between systems/devices (e. g. computers)/components inside a computer. The device 100 may be physically and communicatively coupled to the host system 900 via a bus interface 901 of the host system 900. The device 100 may also be wirelessly and communicatively coupled to the host system 900 via the bus interface 901. When coupled, the device 100 may draw power from the host system 900 to function. The host system 900 may include any suitable system and/or device such as, by way of example and not as a limitation, a personal computer, a laptop, a universal serial bus (USB) power delivery (PD) power adaptor, a USB PD battery power bank, and the like. The device 100 may include any suitable system and/or device such as, by way of example and not as a limitation, a sound system, a fan, a wearable device (e. g. watch, band, glasses, etc.), a tablet, a phone, and the like. The host system 900 may be a power supply system, namely a source, and the device 100 may be power receiving device, namely a sink.

According to various non-limiting embodiments, the host system 900 may obtain power from an external source of power. For example, the host system 900 may be connected to and/or communicate with a power adapter configured to supply power to the host system 900 via a suitable external power source, such as a wall socket, external battery, power system unit, or other of power source. Additionally or alternatively, the host system 900 may include one or more internal batteries designed to store energy and operate as an internal energy source to power the host system 900 when power from the external sources is not available (e.g., the host system 900 is unplugged). The internal batteries may be charged when connected to an energy source to store power for later use. The host system 900 may include a power management system. The power management system may distribute power to internal components of the host system 900 and distribute power between the host system 900 and external devices coupled to the host system 900.

The device 100 may be physically attached to the bus interface 901 of the host system 900 via cables, ports, and connectors. The bus interface 901 may include hardware, software, logic, and connectors that are suitable to establish connections with compatible devices. The bus interface 901 may support both data communications and power exchange between the host system 900 and the device 100. In various non-limiting embodiments, the bus interface 901 may be a USB interface which implements corresponding standards, protocols, ports, connectors and components. USB is an industry standard that establishes specifications for cables, connectors and protocols for connection, communication and power supply (interfacing) between computers, peripherals and other computers. Accordingly, the device 100 may be USB compatible devices that are connectable via the bus interface 901 that supports communications and power exchange in accordance with USB. The techniques are not limited to USB, and accordingly devices designed for other types of interfaces and protocols that enable data/powered connections are also contemplated, including both other standard interfaces and proprietary implementations of interfaces.

According to various non-limiting embodiments, the device 100 may include a bus connector 101 for connecting to the bus interface 901 of the host system 900 to provide power to the device 100. That is, the bus connector 101 of the device 100 may be compatible with the bus interface 901 of the host system 900. The device 100 may be a bus powered device, that is, a device that obtains powers from a bus connection. In computer architecture, a bus connection is a communication system that transfers data and energy between components inside a computer, or between computers. Further, the device 100 may have or not have a power adapter to obtain power from an external power source. The device 100 may be a USB powered device. Examples of computer peripheral devices that may be connected and powered via USB include computer keyboards and mice, printers, fans, speakers, mobile (portable) digital telephones, disk drives, and network adapters.

According to various non-limiting embodiments, the device 100 may include an acquisition module 103 configured to acquire a type of an interface of the host system 900 and an available power of the host system 900. The host system 900 may include a bus interface 901 and the bus interface 901 may include a port for connecting with the bus connector 101 of the device 100. The bus interface 901 of the host system 900 may include a USB port. The USB port may follow a USB standard including USB 2.0, USB 3.1, USB BC 1.2, USB type-C, USB PD and any standard developing or developed in the future. Accordingly, the USB standard may define a nominal voltage and a maximum current as follows shown in Table 1 as examples. The acquisition module 103 may be configured to acquire the type of the port and accordingly acquire the nominal voltage and the maximum current of the port. The type of the interface may also include information regarding characteristics associated with the host system 900 such as device types, capabilities, and/or states of the devices and the like.

TABLE 1

| USB standards | | | | |
|---|---|---|---|---|
| Precedence | Mode of Operation | | Nominal Voltage | Maximum Current |
| Highest | USB PD | | Configurable | 5 A |
| ↓ | USB Type-C Current @ 3.0 A | | 5 V | 3.0 A |
| Lowest | USB Type-C Current @ 1.5 A | | 5 V | 1.5 A |
| | USB BC 1.2 | | 5 V | Up to 1.5 A |
| | Default USB Power | USB 3.1 | 5 V | 900 mA |
| | | USB 2.0 | 5 V | 600 mA |

According to various non-limiting embodiments, the acquisition module 103 may be configured to acquire the available power of the host system 900. The available power may be provided by the power management system of the host system 900. The available power may be computed by analyzing the power usage of the operation of the host system 900. The power usage may include operation mode, processing workload, application(s) being used, and other factors that determine how much power is consumed. The acquisition module 103 may automatically communicate with the host system 900 to acquire the available power of the host system 900 after the device 100 is coupled to the host system 900. In other words, no user input may be required to acquire the available power of the host system 900.

According to various non-limiting embodiments, the device 100 may also include a determination module 105 configured to communicate with the acquisition module 103 and determine a power level to be distributed from the host system 900 to the device 100 based on the type of the interface and the available power of the host system 900. The determination module 105 may obtain the information indicative of the type of the interface and the available power of the host system 900 from the acquisition module 103 and determine the power level that the host system 900 may transfer to the device 100 based on the information obtained. The available power of the host system 900 may represent the maximum power that the host system 900 may distribute or transfer to the device 100 while maintaining its normal operation. The power level may represent an amount of power that is to be distributed/transferred from the host system 900 to the device 100. Accordingly, the power level may be determined corresponding to the maximum power that the host system 900 is capable to transfer to the device 100. In various non-limiting embodiments, the powered level may represent a maximum power that the device 100 may obtain from the host system 900. The power level may also be determined in light of the type of the interface 901. That is, if the available power of the host system 900 is greater than the nominal voltage of the interface 901, the power level may be lowered in accordance with the nominal voltage of the interface 901. The determined power level may increase as a maximum current of the interface 901 of the host system 900 dependent on the type thereof increases. Determining the power level will be described in greater details with reference to FIG. 5.

According to various non-limiting embodiments, the device 100 may further include a controller module 107 configured to communicate with the determination module 105 to obtain the determined power level and distribute the determined power level to the device 100. The controller module 107 may include hardware such as a system-on-chip (SOC) or one or more microcontroller(s) designed to perform a predefined set of designated tasks. In this example, the controller module 107 may be configured to implement power management related functions and tasks including but not limited to controlling and distributing power to the device 100. Thus, the controller module 107 may include processing components, I/O devices/peripherals, various types of memory (ROM, RAM, Flash, EEPROM), programmable logic, and so forth. Further, the controller module 107 may include a Bluetooth SOC.

Figure 2:
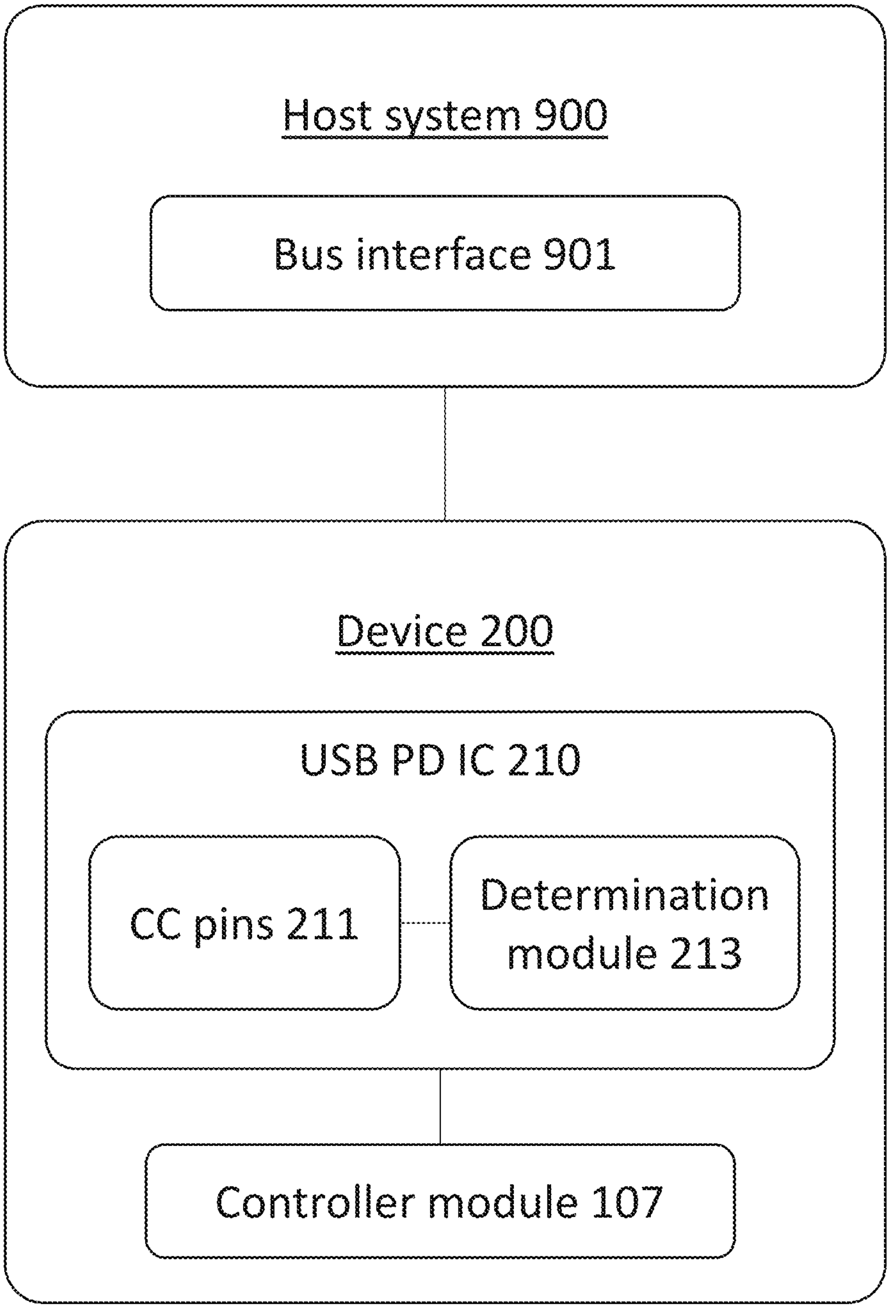
FIG. 2 is a block diagram depicting an example configuration of USB powered device in connection to a host system according to an embodiment of the present disclosure.

FIG. 2 is a block diagram depicting an example configuration of USB powered device 200 in connection to the host system 900 according to an embodiment of the present disclosure. According to various non-limiting embodiments, the device 200 may include features of the device 100 as described above in connection with FIG. 1, and therefore, the common features are labelled with the same reference numerals and need not be described.

According to various non-limiting embodiments, the device 200 may include a USB power delivery (PD) Integrated Circuit (IC) 210 and the controller module 107. The USB PD IC 210 may include configuration channel (CC) pins 211 for data communication, voltage bus pins for energy transfer and ground pins. The pins of the USB PD IC 210 may function as the USB connector of the device 200. The CC pins 211 may be configured to acquire the type of the interface of the host system 900 and the available power of the host system 900, whereby the CC pins 211 act as an acquisition module. The CC pins 211 may function similarly as the acquisition module 103 of device 100. The determination module 213 included in the USB PD IC 210 of the device 200 may function similarly as the determination module 105 of the device 100.

Figure 3:
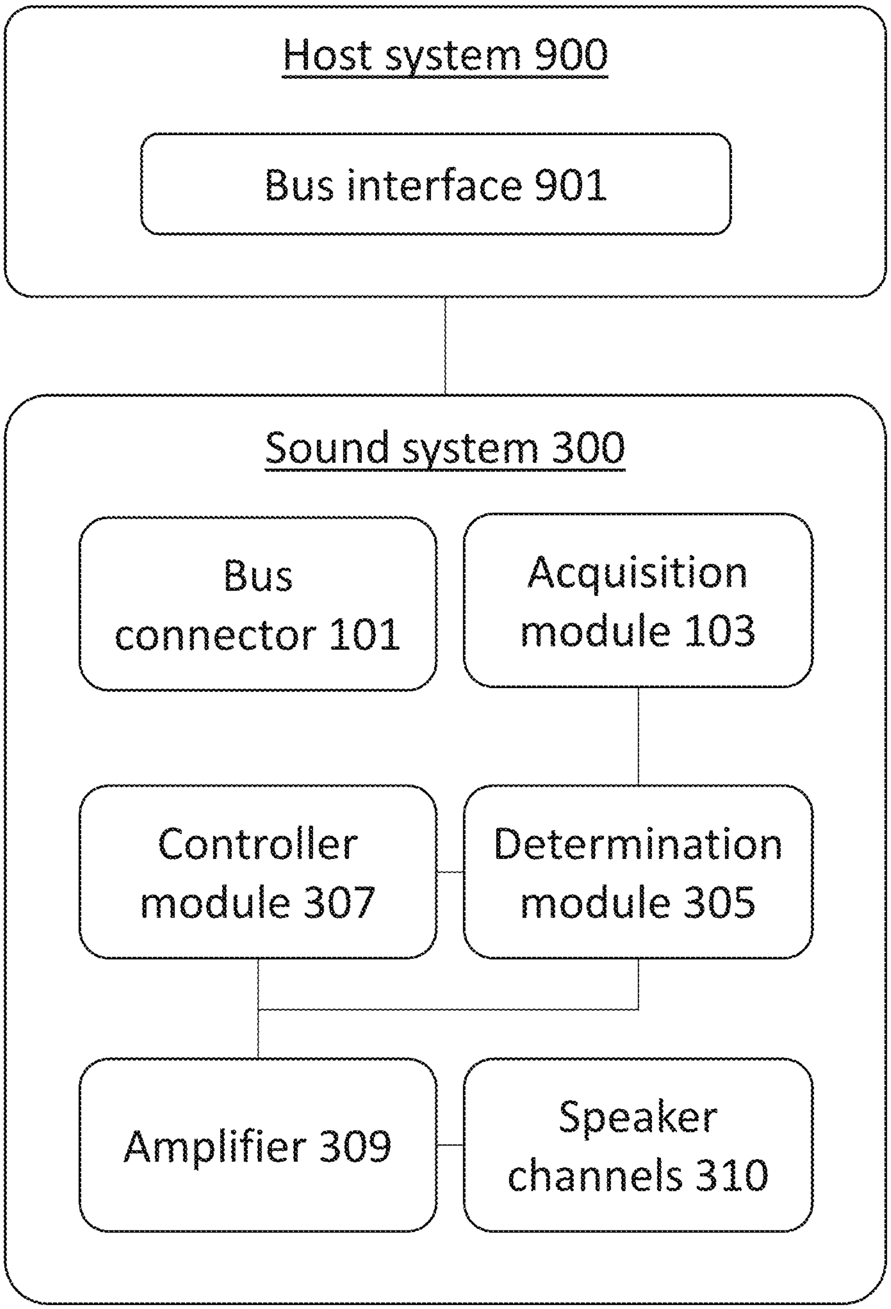
FIG. 3 is a block diagram depicting an example configuration of bus powered sound system in connection to a host system according to an embodiment of the present disclosure.

FIG. 3 is a block diagram depicting an example configuration of bus powered sound system 300 in connection to the host system 900 according to an embodiment of the present disclosure. According to various non-limiting embodiments, the sound system 300 may include features of the devices 100 and 200 as described above in connection with FIGS. 1 and 2, and therefore, the common features are labelled with the same reference numerals and need not be described.

According to various non-limiting embodiments, the sound system 300 may include the bus connector 101, the acquisition module 103, a determination module 305, a controller module 307, an amplifier 309 and one or more speaker channels 310. The determination module 305 of the sound system 300 may function similarly as the determination module 105 of the device 100. The amplifier 309 may provide the determination module 105 with a demand for power. A demand for power may represent a power that the amplifier 309 requires for its amplification. The determination module 305 may be further configured to determine the power level to be distributed from the host system 900 to the sound system 300 (e.g. the amplifier 309) based on the demand of the amplifier 309. For example, the power level may be lowered if the demand of the amplifier 309 is low. The controller module 307 of the sound system 300 may function similarly as the controller module 107 of the device 100. The controller module 307 may be further configured to automatically adjust power amplification dependent on the determined power level and in accordance with the specification of each of the one or more channels 310, that is, without user input. The determined power level may be equally distributed to each of the one or more channels 310 of the sound system 300 by the controller module 307. The determined power level may also be distributed to each of the one or more channels 310 of the sound system 300 in accordance with the specification of each of the one or more channels 310.

Figure 4:
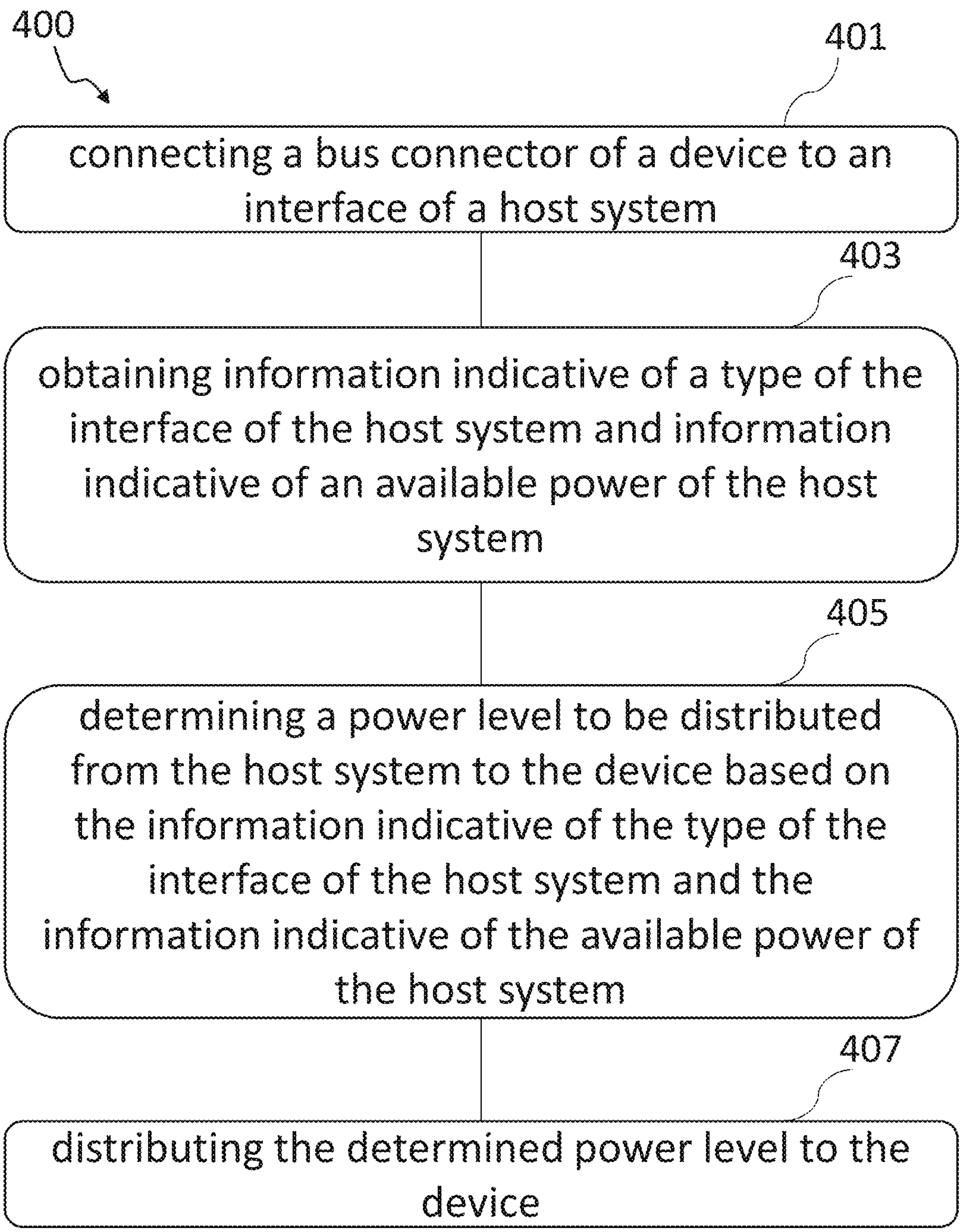
FIG. 4 is a flowchart illustrating an exemplary method implemented by a bus powered device according to an embodiment of the present disclosure.

FIG. 4 is a flowchart illustrating an exemplary method 400 implemented by a bus powered device according to an embodiment of the present disclosure. According to various non-limiting embodiments, the method 400 may be implemented by the devices 100, 200, 300 and 600. The method may include connecting a bus connector of a device to an interface of a host system (step 401). The host system may include the host systems 900, 800. The device may include any suitable device as described above, particularly, a sound system. Connecting may include wirelessly or wired connecting by a cable such that the device and the host system may communicate to each other and transfer energy from the host system to the device. The method 400 may include obtaining information indicative of a type of the interface of the host system and information indicative of an available power of the host system (step 403). The type of the interface may include any suitable interface as described above, particularly, a USB port. The available power of the host system may be the power that is available to be transferred from the host system to the device without affecting the normal operation of the host system and in light of the type of the interface. Stated differently, the power management system of the host system may distribute or assign the available power to external devices coupled to the host system in accordance with the algorithm programmed therein.

Figure 5:
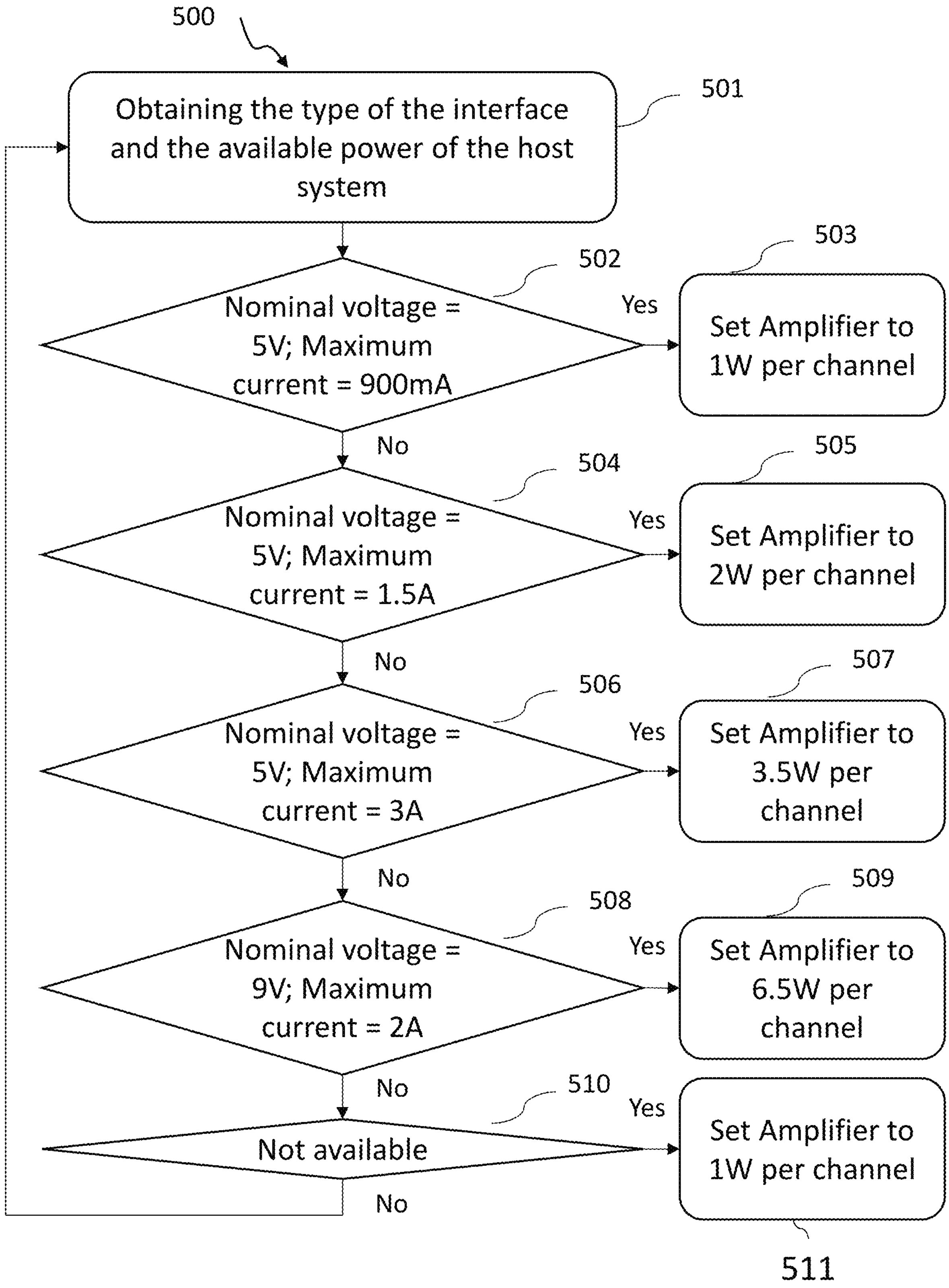
FIG. 5 is a flowchart illustrating an exemplary method implemented by the sound systems of FIGS. 3 and 6.

The method 400 may further include determining a power level to be distributed from the host system to the device based on the information indicative of the type of the interface of the host system and the information indicative of the available power of the host system (step 405). The power level may be determined in accordance with the method 500 as shown in FIG. 5 and will be described in greater details with reference to FIG. 5. The determined power level may present an amount of power that to be distributed/transferred to the device. The determined power level may be equal to or different from the amount of available power of the host system. The determined power level may be less than half of the available power as assigned by the host system to avoid saturation or power trip when audio plays at maximum volume. The method 400 may also include distributing the determined power level to the device (step 407). In case the device is a sound system, the determined power level may be equally distributed to each of one or more speaker channels of the sound system. The method 400 may be initiated automatically once the device is coupled with the host system and accordingly, without user input.

Figure 6:
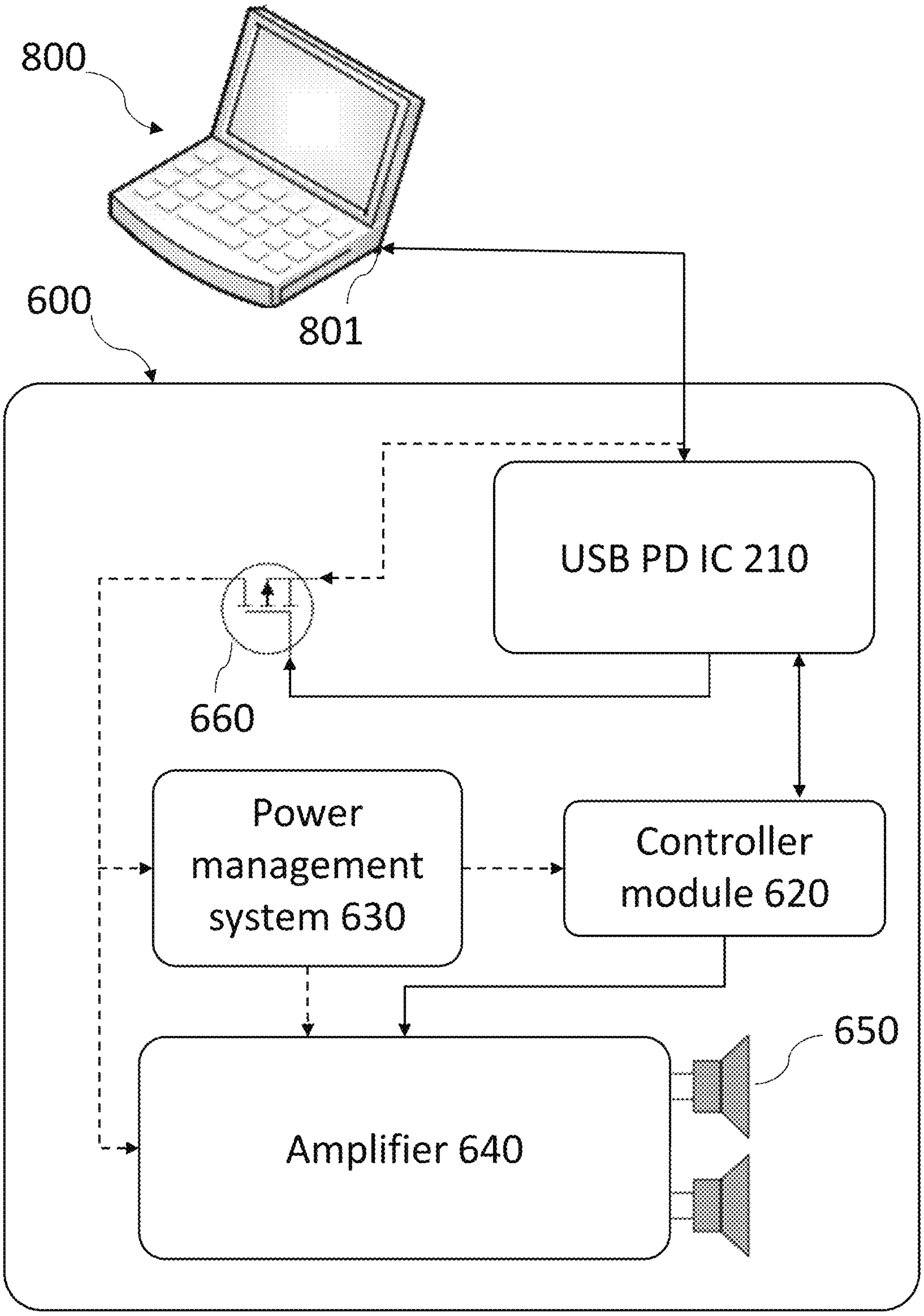
FIG. 6 is a diagram depicting an example USB powered sound system in connection to a host system according to an embodiment of the present disclosure.

FIG. 5 is a flowchart illustrating an exemplary method 500 implemented by the sound systems 300, 600 of FIGS. 3 and 6. Although the method 500 is described with reference to the sound systems 300, 600 with one or more speaker channels, it should be understand that the method 500 as shown in FIG. 5 may also be adopted by the devices 100, 200. Particularly, the method 500 as shown in FIG. 5 may be performed by the determination modules 105, 213 and 305. The method 500 may start with obtaining the type of the interface and the available power of the host system (step 501). The type of the interface may include information regarding the nominal voltage and the maximum current of the interface (e.g. the port).

The method 500 may proceed to determine if the nominal voltage is equal to 5V and the maximum current is 900 mA (step 502). If yes, the method 500 may proceed to set the amplifier to 1 W per channel (step 503); if no, the method 500 may proceed to determine if the nominal voltage is equal to 5V and the maximum current is 1.5 A (step 504). If the nominal voltage is equal to 5V and the maximum current is 1.5 A, the method 500 may proceed to set the amplifier to 2 W per channel (step 505); if no, the method 500 may proceed to determine if the nominal voltage is equal to 5V and the maximum current is 3 A (step 506). If the nominal voltage is equal to 5V and the maximum current is 3 A, the method 500 may proceed to set the amplifier to 3.5 W per channel (step 507); if no, the method 500 may proceed to determine if the nominal voltage is equal to 9V and the maximum current is 2 A (step 508). If the nominal voltage is equal to 9V and the maximum current is 2 A, the method 500 may proceed to set the amplifier to 6.5 W per channel (step 509); if no, the method 500 may proceed to determine if the type of the interface and the available power of the host system are not available (step 510). If the information is not available, the method 500 may proceed to set the amplifier to 1 W per channel (step 511); if the information is available but there is an error, the method 500 may consider (e.g., determine, e.g. recognize) that there is a logic error and return to the step 501. The information indicative of the type of the interface and the information indicative of the available power of the host system may not be available if the interface (the host system) is not configured to provide such information.

The method 500 is exemplary only and a method to determine the power level shall not be limited to method 500. For example, the steps 502, 504, 506 may be in a different sequence. In various non-limiting embodiments, in step 502, the method 500 may determine if the nominal voltage is equal to 5V and the maximum current is 3 A; in step 504, the method 500 may determine if the nominal voltage is equal to 5V and the maximum current is 2 A; and so on. In other words, the method 500 may determine the maximum current in a decreasing manner or in an increasing manner; the method 500 may determine the maximum current in a random manner; the method 500 may determine the maximum current starting from the most popular used maximum current and in a manner that the popularity of the maximum current decreases. The method may subsequently determine if the nominal voltage is equal to 9V and the maximum current is 2 A and so on.

In various non-limiting embodiments, another method may include first determining if the nominal voltage is equal to 5V, and if yes, the method may proceed to determine the maximum current in a certain manner and set the amplifier to a corresponding value per channel, and if no, the method 500 may proceed to determine if there is no information available as step 510. It also should be appreciated that the nominal voltages of 5V, 9V are commonly used at present but the method should not be limited to such a voltage and include any suitable voltage (e.g. 12V, 15V, 20V) compatible with prevailing or future protocols/standards. The same analogy applies to the maximum current and the amplification.

The amplifier may be set according to a stepped profile, for example, an increasing stepped profile including 1 W, 2 W, 3.5 W and 6.5 W. The value of amplification may include an integer number or an integer number plus a half of an integer number. When the method 500 determines that there is no information available as in step 510, the amplifier may be set to a predetermined value (e.g. 1 W). The predetermined value may be equal to a lowest value according to the stepped profile of the amplification. The sum of the amplification may be substantially equal to the determined power level. A relationship between the maximum current and the amplification per channel may be predetermined in accordance with a number of the channels. Similarly, the distributed power level shall not be limited to 1 W, 2 W, 3.5 W and 6.5 W and shall include any suitable power level (e.g. 10 W, 20 W, 100 W).

According to various non-limiting embodiments, the method 500 may be adopted by the devices 100, 200 and be performed by the determination modules 105 and 213. The power level may be determined in accordance with the nominal voltage and the maximum current of the interface as described above. The power level may be fully or partially distributed/assigned to corresponding components of the devices 100, 200.

FIG. 6 is a diagram depicting an example USB powered sound system 600 in connection to a host system 800 according to an embodiment of the present disclosure. The sound system 600 may include features of the devices 100, 200 and 300 as described above in connection with FIGS. 1, 2 and 3, and therefore, the common features are labelled with the same reference numerals and need not be described.

FIG. 6 shows a sound system 600 that may include USB PD IC 210 and the USB PD IC 210 may function similarly as described above with reference to FIG. 2. The sound system may also include a controller module 620, a power management system 630, an amplifier 640 and one or more speaker channels 650. The controller module 620 may be configured to distribute the determined power level to the one or more channels of the sound system 600 through the power management system 630. The power management system 630 may be configured to adjust an amplification of the amplifier 640 according to the determined power level. The power management system 630 may provide the determination module 213 resided in the USB PD IC 210 with a demand for power.

The sound system may also include a switch 660 in serial connection with the amplifier 640. The switch 640 may be configured to be turned on after the power level to be distributed from the host system 600 to the amplifier 640 is determined. The switch may include a p-type or n-type metal-oxide-semiconductor field-effect transistor (MOSFET). An input (source) of the switch 660 may be connected to the voltage pins of the USB PD IC 210 and an output (drain) of the switch 660 may be connected to the power management 630. A gate of the switch 660 may be connected to the USB PD IC 210. The USB PD IC 210 may apply a (voltage) bias to the gate of the switch 660 and consequently control to turn on or off the switch 660.

The solid lines in FIG. 6 represent data communication whereas the dashed lines in FIG. 6 represent power transmission. Power may be transmitted from the host system 800 to the amplifier 640 and the speaker channels 650 through the switch 660 and the power management system 630. Accordingly, power may not be transmitted if the switch 660 is turned off, in other words, the voltage bus line is open. The USB PD IC 210 may be used as a front end interface of the USB interface.

The host system 800 may be a laptop having an interface 801 and function similarly as the host system 900 as described above. The sound system 600 may be electrically and/or communicatively coupled with the host system 800 to obtain power therefrom. The power management system included in the host system 600 may generate or alter an electrical signal based at least in part on the power consumption of the host system 600 (e.g. processing system, applications) and convey that signal to the USB PD IC 210. The USB PD IC 210 may process (e.g., with a computer processor) the signal it receives from the host system 800 and determine a power level, which it may communicate to the controller module 620. Though FIG. 6 shows the host system 800 and the sound system 500 coupled via wired connections (e.g., via wires), the host system 800 and the sound system 500 may have circuitry (e.g., transmitter(s), receiver(s), transceiver(s)) that allow for wireless energy transfer and communication protocols to be employed between them. Moreover, in some implementations (not shown), the USB PD IC 210 and the amplifier 640 may be comprised in separate devices (e.g., a separate USB PD IC and a sound system). Further, the sound system 600 may have further computing modules (e.g., circuitry, electronics), described below in connection with FIG. 7, for implementing the operations disclosed herein.

Figure 7:
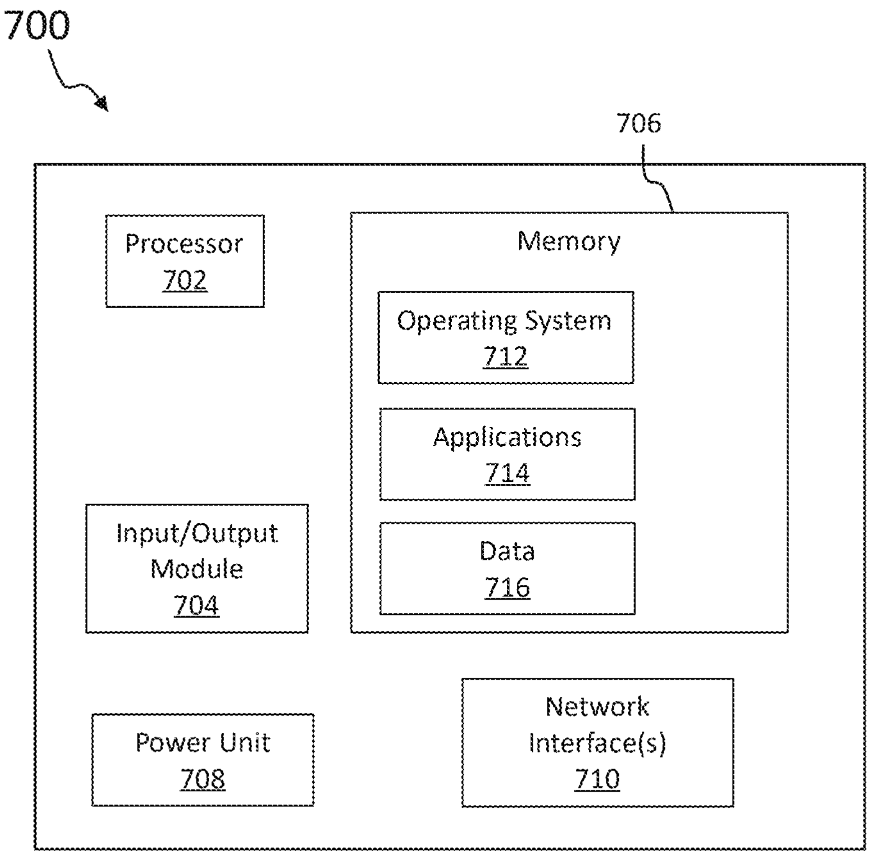
FIG. 7 is a block diagram showing an example electronic device, according to an implementation of the present disclosure.

FIG. 7 is a block diagram showing an example electronic device 700, according to an implementation of the present disclosure. The electronic device 700 may be a laptop computer, a desktop computer, a tablet computer, an automobile computer, a gaming device, a smart phone, a personal digital assistant, a server, a sound system or other electronic devices capable of running computer applications. In some implementations, the electronic device 700 includes a processor 702, an input/output (I/O) module 704, memory 706, a power unit 708, and one or more network interfaces 710. The electronic device 700 can include additional components. In some implementations, the processor 702, input/output (I/O) module 704, memory 706, power unit 708, and the network interface(s) 710 are housed together in a common housing or other assembly.

The example processor 702 can execute instructions, for example, to generate output data based on data inputs. The instructions can include programs, codes, scripts, modules, or other types of data stored in memory (e. g., memory 706). Additionally or alternatively, the instructions can be encoded as pre-programmed or re-programmable logic circuits, logic gates, or other types of hardware or firmware components or modules. The processor 702 may be, or may include, a multicore processor having a plurality of cores, and each such core may have an independent power domain and can be configured to enter and exit different operating or performance states based on workload. Additionally or alternatively, the processor 702 may be, or may include, a general-purpose microprocessor, as a specialized co-processor or another type of data processing apparatus. In some cases, the processor 702 performs high-level operation of the electronic device 700. For example, the processor 702 may be configured to execute or interpret software, scripts, programs, functions, executables, or other instructions stored in the memory 706.

The example I/O module 704 may include a mouse, keypad, touch screen, scanner, optical reader, and/or stylus (or other input device(s)) through which a user of the electronic device 700 may provide input to the electronic device 700, and may also include one or more of a speaker for providing audio output and a video display device for providing textual, audiovisual, and/or graphical output.

The example memory 706 may include computer-readable storage media, for example, a volatile memory device, a non-volatile memory device, or both. The memory 706 may include one or more read-only memory devices, random-access memory devices, buffer memory devices, or a combination of these and other types of memory devices. In some instances, one or more components of the memory can be integrated or otherwise associated with another component of the electronic device 700. The memory 706 may store instructions that are executable by the processor 702. In some examples, the memory 706 may store instructions for an operating system 712 and for application programs 714. The memory 706 may also store a database 716.

The example power unit 708 provides power to the other components of the electronic device 700. For example, the other components may operate based on electrical power provided by the power unit 708 through a voltage bus or other connection. In some implementations, the power unit 708 includes a battery or a battery system, for example, a rechargeable battery. In some implementations, the power unit 708 includes an adapter (e.g., an AC adapter) that receives an external power signal (from an external source) and coverts the external power signal to an internal power signal conditioned for a component of the electronic device 700. The power unit 708 may include other components or operate in another manner.

The electronic device 700 may be configured to operate in a wireless, wired, or cloud network environment (or a combination thereof). In some implementations, the electronic device 700 can access the network using the network interface(s) 710. The network interface(s) 710 can include one or more adapters, modems, connectors, sockets, terminals, ports, slots, and the like. The wireless network that the electronic device 700 accesses may operate, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e. g., Wi-Fi networks), and others. Examples of PANs include networks that operate according to short-range communication standards (e. g., BLUETOOTH®, Near Field Communication (NFC), ZigBee), millimeter wave communications, and others. The wired network that the electronic device 700 accesses may, for example, include Ethernet, SONET, circuit-switched networks (e. g., using components such as SS7, cable, and the like), and others.

Various aspects of what is described here have provided a bus powered device with improved power controls.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i. e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e. g., multiple CDs, disks, or other storage devices).

Some of the operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e. g., an FPGA (field programmable gate array) or an ASIC (application specific integrated circuit). The apparatus can also include, in addition to hardware, code that creates an execution environment for the computer program in question, e. g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e. g., one or more scripts stored in a markup language document), in a single file dedicated to the program, or in multiple coordinated files (e. g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e. g., an FPGA (field programmable gate array) or an ASIC (application specific integrated circuit).

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple implementations separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of implementations have been described. Nevertheless, it will be understood that various modifications can be made. Accordingly, other implementations are within the scope of the following claims.

What is claimed is:

1. A bus powered sound system comprising:

an amplifier;

a bus connector for connecting to an interface of a host system to provide power to the amplifier;

an acquisition module configured to acquire a type of the interface of the host system and an available power of the host system;

a determination module configured to communicate with the acquisition module and determine a power level to be distributed from the host system to the amplifier based on the type of the interface and the available power of the host system, wherein the determined power level is determined according to a stepped profile, wherein the stepped profile comprises a plurality of discrete power levels, each corresponding to a respective type of the interface of the host system, such that the determined power level is selected based on the type of the interface; and a controller module configured to communicate with the determination module and distribute the determined power level to one or more channels of the sound system.

2. The bus powered sound system of claim 1, wherein the determined power level increases as a maximum current of the interface of the host system dependent on the type thereof increases.

3. The bus powered sound system of claim 1, wherein the determination module is further configured to determine the power level to be distributed from the host system to the amplifier based on a demand of the amplifier.

4. The bus powered sound system of claim 1, further comprising:

a switch in serial connection with the amplifier, wherein the switch is configured to be turned on after the power level to be distributed from the host system to the amplifier is determined, and wherein the switch comprises a metal-oxide-semiconductor field-effect transistor (MOSFET).

5. The bus powered sound system of claim 1, wherein the determined power level is equally distributed to each of the one or more channels of the sound system.

6. The bus powered sound system of claim 1, wherein the bus connector comprises configuration channel (CC) pins configured to acquire the type of the interface of the host system and the available power of the host system, whereby the CC pins act as the acquisition module.

7. The bus powered sound system of claim 1, further comprising:

a power management system, wherein the controller module is configured to distribute the determined power level to the one or more channels of the sound system through the power management system, wherein the power management system is configured to adjust an amplification of the amplifier according to the determined power level.

8. The bus powered sound system of claim 1, wherein the bus connector comprises a universal serial bus (USB) connector.

9. The bus powered sound system of claim 1, wherein the host system comprises at least one of a personal computer, a laptop, a USB power delivery (PD) power adaptor or a USB PD battery power bank.

10. The bus powered sound system of claim 1, wherein the controller module comprises a microcontroller or a Bluetooth system on a chip (SoC).

11. The bus powered sound system of claim 1, wherein each discrete power level corresponds to a respective pair of nominal voltages and maximum currents.

12. A universal serial bus (USB) powered device comprising:

a USB power delivery (PD) integrated circuit (IC) interface for connecting to an interface of a host system to provide power to the device, the USB PD IC interface comprising:

configuration channel (CC) pins configured to acquire a type of the interface of the host system and a power of the host system available for use by the device; and a determination module configured to determine a power level to be distributed from the host system to the device based on the type of the interface and the power of the host system available for use by the device, wherein the determined power level is determined according to a stepped profile, wherein the stepped profile comprises a plurality of discrete power levels, each corresponding to a respective type of the interface of the host system, such that the determined power level is selected based on the type of the interface; and a controller module configured to communicate with the USB PD IC interface and distribute the determined power level to the device.

13. A method implemented by a bus powered sound system comprising:

connecting a bus connector of the sound system to an interface of a host system;

obtaining information indicative of a type of the interface of the host system and information indicative of an available power of the host system;

determining a power level to be distributed from the host system to the sound system based on the information indicative of the type of the interface of the host system and the information indicative of the available power of the host system, wherein the determined power level is determined according to a stepped profile, wherein the stepped profile comprises a plurality of discrete power levels, each corresponding to a respective type of the interface of the host system, such that the determined power level is selected based on the type of the interface; and distributing the determined power level to one or more channels of the sound system.

14. The method of claim 13, wherein the determined power level increases as a maximum current of the interface of the host system dependent on the type thereof increases.

15. The method of claim 13, wherein the step of determining the power level to be distributed from the host system to the sound system comprises determining the power level based on a demand of the sound system.

16. The method of claim 13, further comprising:

turning on a switch so as to close a voltage bus circuit to distribute the determined power level to the sound system after the power level to be distributed from the host system to the sound system is determined.

17. The method of claim 13, wherein the determined power level is equally distributed to each of the one or more channels of the sound system.

18. The method of claim 13, wherein the step of determining the power level to be distributed from the host system to the sound system comprises determining the power level as a predetermined power level when the step of obtaining the information indicative of the type of the interface of the host system and the information indicative of the available power of the host system fails to obtain either of the information.

19. The method of claim 18, wherein the predetermined power level is equal to a lowest power level according to the stepped profile of the determined power level.

20. The method of claim 13, wherein the step of determining the power level to be distributed from the host system to the sound system comprises mapping the information indicative of the type of the interface of the host system including a pair of nominal voltage and maximum current to the discrete power levels.

* * * * *